June 10, 1947.  J. L. HATHAWAY  2,421,785
ELECTRIC ALTIMETER
Filed Feb. 28, 1939

Inventor
Jarrett L. Hathaway
By
Attorney

Patented June 10, 1947

2,421,785

UNITED STATES PATENT OFFICE 2,421,785

ELECTRIC ALTIMETER

Jarrett L. Hathaway, Manhasset, N. Y., assignor to Radio Corporation of America, a corporation of Delaware Application February 28, 1939, Serial No. 259,066

14 Claims. (Cl. 177—352)

1

This invention relates to aircraft altimeters in which a wave propagating method for measuring long distances is combined with a balancing system especially adapted for measuring short distances.

Various systems have been proposed for measuring the altitude of aircraft. In one system, waves are transmitted from the aircraft and the time between the transmission of the wave and its reception after reflection from the surface of the earth is indicated. Since the velocity of transmission is known, the distance traveled may be readily determined. In one system of this type, the wave energy consists of discrete pulses. In another system, the wave energy is a radio frequency wave which is continuously changed in frequency so that the change of frequency between the transmitted and reflected waves indicates altitude. Systems of both types are especially adaptable for the measurement of altitudes of the order of 50 feet and upwards. These systems become less and less suitable as the altitude diminishes because the time intervals become extremely short.

There are other systems in which the change of capacity, or change of impedance, is measured as a function of the altitude above the surface which brings about the change. These systems, which depend upon a change in the balance condition, are especially suitable to determine low altitudes; for example, altitudes of 100 feet or less.

It is an object of this invention to combine in a single indicating instrument the desirable characteristics of systems adaptable in the measurement of high altitudes with systems especially suitable in determining low altitudes. It is a further object of this invention to utilize apparatus which will have a common function in the measurement of the altitude of an aircraft or the like. A further object is to provide means for indicating the altitude of an aircraft with respect to the nearest object and to record the altitude of the aircraft as it travels along a course. A still further object is to operate a warning signal when the altitude of the aircraft reaches a predetermined limit.

Figure 1:
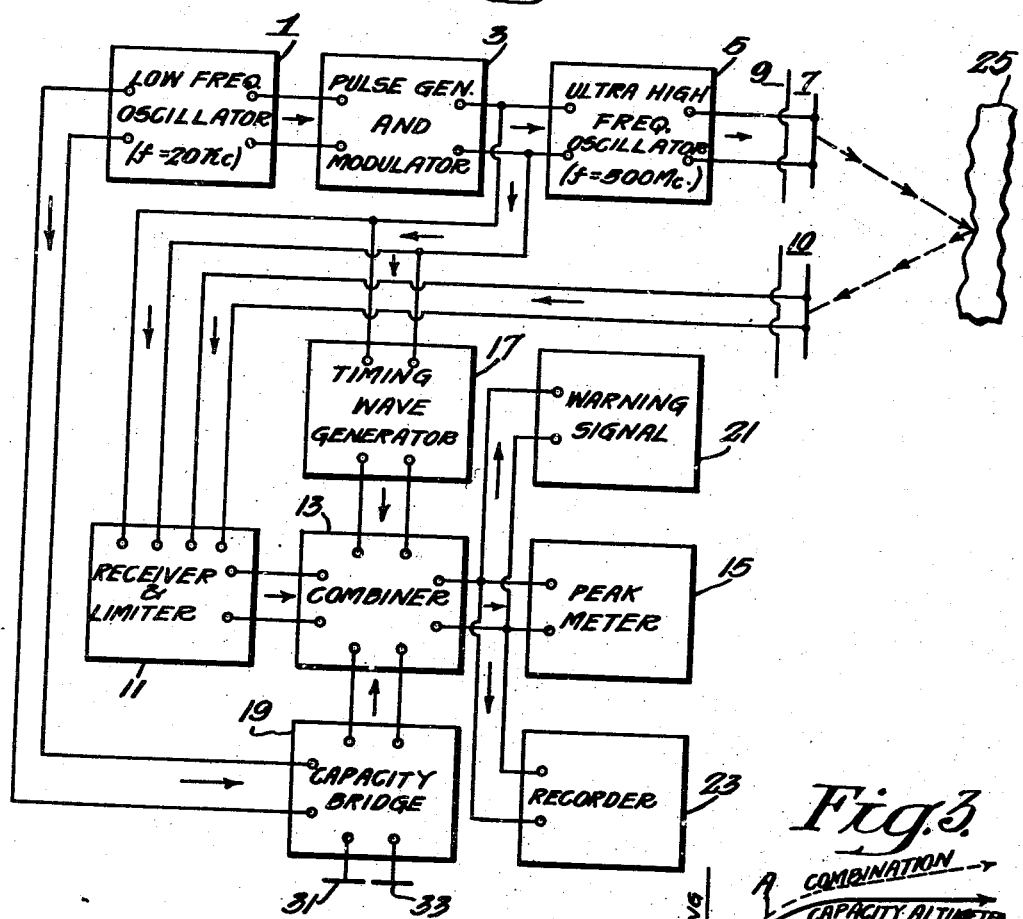
Figure 3:
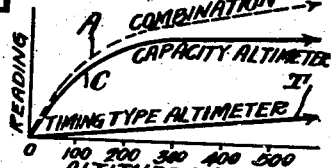
Figure 2:
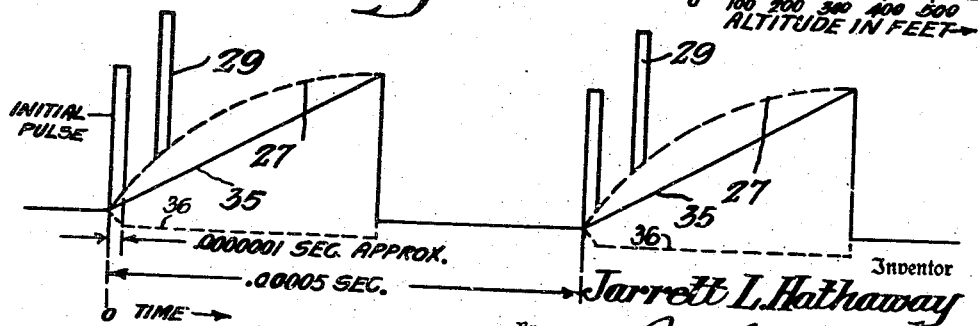

The invention will be described by reference to the accompanying drawing in which:

Figure 1 is a schematic representation of one embodiment of the invention; Figure 2 is a graph indicating the wave form of the currents which are applied to the indicator; and Figure 3 is a graph illustrating the characteristics of the altimeter.

2

Referring to Fig. 1, a low frequency oscillator 1 is connected to a pulse generator and modulator 3. The pulse generator is effectively connected to an ultra high frequency oscillator 5 whose output circuit is connected to an antenna array 7. The antenna preferably includes a reflector or director 9 for making the transmission as directive as practical. A second directive antenna 10 is connected to a radio receiver 11 which includes a limiter which may consist of a thermionic tube operating at cut-off or saturation grid bias. The output of the radio receiver is applied to a combiner 13 which, in turn, is connected to a peak meter 15. The combiner may be a thermionic tube upon whose input circuit are applied serially the voltages to be combined.

The pulse generator and modulator 3 is connected to a timing wave generator 17 which is connected to the combiner 13. The pulse generator is also connected to the radio receiver 11. The low frequency oscillator is connected to a Wheatstone A. C. capacity bridge 19 which is in turn connected to the combiner 13. Any warning signal 21 and any recorder 23 may be connected in parallel with the peak meter.

The operation of the system is essentially as follows: The low frequency oscillator may generate sinusoidal currents which may have a frequency, for example, of 20 kcs. These currents are applied to the pulse generator in which a sharply defined pulse is generated for each cycle of the low frequency oscillator. This pulse has a duration of the order of one-tenth microsecond. The pulse is applied to key the ultra high frequency oscillator so that a discrete pulse of radio frequency energy is directively radiated from the antenna 7 toward the earth or other object 25. The pulse of high frequency energy is reflected and induces electromotive forces in the receiving antenna 10 which cause currents to flow to the receiver 11. The connection from the pulse generator to the receiver is to partially blank the receiver during the pulse transmission. This is not required if sufficient antenna directivity is maintained so that the received pulse may be satisfactorily limited. The receiver includes means which limit the amplitude of the pulses. The timing wave generator operates in synchronism with the pulse generator and establishes timing potentials having a wave form 27 or 35 such as is indicated in Fig. 2. The currents or potentials from the timing wave generator and the receiver are added in the combiner 13 and hence applied to the peak meter 15. The peak meter indicates the sum of the potentials corresponding to the timing wave and the limited pulse 29.

In this system, the initial pulse will be indicated and later reflections of the initial pulse will be added to the potentials representing the timing wave. For low altitudes the reflected pulse 29 will combine with the low potential part of the curve 27 and will indicate the altitude as a function of the peak voltage which is read on the peak meter 15. As the altitude increases, the reflected pulse 29 will return after a longer interval and hence will be combined nearer the peak of the timing curve. As the altitude approaches low altitudes, it will be very difficult to distinguish any change in the peak meter reading as the reflected pulses will appear close to the peaks of the initial pulses. At an altitude of the order of 100 feet or more, the capacity bridge, which includes capacitor plates 31, 33, is preferably balanced. As the altitude diminishes, the bridge will become unbalanced and the resulting voltages 36, which are preferably rectified and filtered, will be subtracted in the combiner 13 to thereby indicate diminishing altitudes on the peak meter. The closer the capacity plates 31, 33 are to the earth's surface, the more unbalance will be noted in the bridge circuit, and the more voltage subtracted in the combiner. However, the balance condition may be arranged for zero altitude and the potentials corresponding to unbalance added in the combiner.

The desirability of combining a capacity or balance type of altimeter with a timing type altimeter can be graphically demonstrated. Referring to Fig. 3, the curve C indicates the characteristic of a capacity altimeter. It will be observed that very little change of reading occurs from very high altitudes down to 100 to 200 feet. From 200 feet downward the readings readily indicate small changes in altitude. On the other hand, the timing type altimeter curve T, while sufficiently accurate at the higher altitudes, is not adapted to indicate altitudes below about 100 feet with high accuracy. If the two curves are combined, the resultant curve A provides a characteristic which is extremely accurate for low altitudes and sufficiently reliable for the higher altitudes.

Thus the invention has been described as an altimeter in which high altitudes are determined by propagating discrete pulses of radio frequency energy and in which low altitudes are measured by the balancing action of an electrical bridge. No attempt has been made to describe the details of the various component parts, as all of these parts are well known to those skilled in the art. It should be understood that the invention is not limited to the pulse method of determining the higher altitudes, as the system will work equally well if a frequency modulating system, such as described by Bentley, 2,011,392, is substituted for the pulse method. It should also be understood that the capacity bridge may be of the self-balancing type described in U. S. Patent 2,280,725, granted on April 21, 1942, to F. H. Shepard, Jr., on his application Serial No. 243,171, filed November 30, 1938, and entitled "Self-balancing capacity altimeter," or, in place of a capacity bridge, an impedance measuring method of the type described by Alexanderson, U. S. Patent No. 1,913,148 or Drake U. S. Patent No. 1,987,587 may be used. The electrical timing wave generator may be designed to give a saw-tooth output, or a hyperbolic curve may be used. The shape of the timing wave curve is initially determined to provide the most useful range of indications in the higher altitudes and the bridge unbalance is relied upon to indicate lower altitudes.

I claim as my invention:

1. An altitude indicating device including, in combination, wave timing means for substantially independently indicating altitudes from the order of 100 feet and upwards, and a balancing bridge means for affecting the indications of said timing means at altitudes below said 100 feet.

2. In an altitude indicating device, means for indicating altitudes as a function of the time required to propagate a wave toward the earth and back to the point at which the altitude is to be determined, means for indicating altitude as a function of the balance of an electrical bridge, and means for combining the indications of said first and second mentioned means to provide indications which are dependent on both of said means.

3. An altitude indicating device including means for transmitting discrete pulses of radio frequency energy toward the earth, means for producing an electrical timing wave of the same frequency and in synchronism with said pulses, means for receiving said discrete pulses after reflection from the earth's surface, means for limiting the amplitude of the received pulses, means for combining the electrical timing wave and the limited pulses, and means for indicating the peak potential of said combined wave and limited pulse.

4. In an altitude measuring device including means for transmitting modulated radio frequency energy toward the earth, means for generating an electrical timing wave of the same frequency and in synchronism with the modulation of said energy, an a. c. capacity bridge, means for balancing said capacity bridge as a function of altitude, means for combining said electrical timing wave and the output circuit of said bridge, and means for indicating said combined output.

5. In an altitude measuring device including means for transmitting modulated radio frequency energy toward the earth, means for generating an electrical timing wave of the same frequency and in synchronism with the modulation of said energy, an a. c. capacity bridge, means for balancing said capacity bridge as a function of altitude, means for combining said electrical timing wave and the output circuit of said bridge, and means for indicating the peak potential of said combined timing wave and the potential in said bridge output circuit.

6. In an altimeter indicating device, a low frequency oscillator, means for deriving discrete pulses from said low frequency oscillator, an ultra high frequency oscillator, means for applying said discrete pulses to key said high frequency oscillator, means for radiating pulses of high frequency energy, means for receiving said pulses after reflection, means for limiting the received pulse, means for generating an electrical timing wave of the same frequency and in synchronism with said pulses, means for combining the received limited pulses and the timing wave, and means for indicating the peak potential of said combined limited pulse and timing wave.

7. In a device of the character of claim 6, a capacity bridge, means for applying said low frequency oscillations to two of the terminals of said bridge, and means for combining the output of said capacity bridge with said electrical timing wave and said limited pulses, and means for indicating said combined outputs.

8. The method of indicating the distance from a point to a surface which includes radiating modulated radio frequency energy from said point toward said surface, receiving said energy after reflection, limiting the potential of said received energy, generating an electrical timing wave of the same frequency as said modulation of said energy in synchronism with said radiation, combining said limited potential with said timing wave, and indicating the peak of said combination.

9. The method of indicating the distance from a point to a surface which includes radiating pulses of radio frequency energy from said point toward said surface, receiving said pulses after reflection, limiting the potential of said received pulses, generating an electrical potential timing wave of the same frequency as said pulses in synchronism with said radiation, combining said limited potential with said timing wave potential, and indicating the peak of said combined potential.

10. The method of indicating the distance from a point to a surface which includes radiating modulated radio frequency energy from said point toward said surface, receiving said energy after reflection, limiting the potential of said received energy, generating an electrical timing wave of the same frequency as said modulation of said energy in synchronism with said radiation, combining said limited potential with said timing wave, generating oscillatory currents, balancing said oscillatory currents at a predetermined altitude, deriving potentials resulting from unbalancing at other than said predetermined altitude, and combining said potentials with said timing wave to indicate said other altitude.

11. An altitude indicating device including an indicator, an electrical bridge, means for balancing said bridge at a predetermined altitude, means for deriving currents varying as a function of said balance, means for applying said derived currents to said indicator, means for transmitting toward the earth from an altitude to be determined radio frequency energy, means for receiving said energy after reflection from the earth, means for timing said transmission to the earth and return to measure altitudes in excess of said predetermined altitude, and means for applying currents corresponding to said last mentioned altitudes to said indicator.

12. An altimeter including means for radiating radio frequency energy, means for receiving said energy after reflection from a surface the distance of which is to be determined, means connected to said receiving means for indicating the distance of said surface whereby distances in excess of a predetermined minimum may be indicated as a function of the propagation time of said radiated and reflected energy, an electrical bridge including an element which varies as a function of distance from said surface and unbalances said bridge, means for deriving currents corresponding to said bridge unbalance, and means for applying said derived currents to said indicating means to indicate distances less than said predetermined minimum.

13. An altimeter including in combination means for radiating radio frequency energy toward and receiving said energy after reflection from a reflecting surface for determining distances greater than a predetermined minimum, an electrical bridge including an element varying as a function of distances less than said minimum, and a common indicator responsive respectively to said means and to said bridge for indicating distances greater than and less than and including said predetermined minimum.

14. Altitude measuring apparatus comprising, in combination, a radio frequency timing type altimeter, a reactive bridge type altimeter and a common indicator responsive simultaneously to both said timing type and said bridge type altimeters.

JARRETT L. HATHAWAY.

REFERENCES CITED

The following references are of record in the file of this patent:

UNITED STATES PATENTS

| Number | Name | Date |
|---|---|---|
| 2,055,883 | Terry | Sept. 29, 1936 |
| 2,250,708 | Herz | July 29, 1941 |